(12) United States Patent
Judd et al.

(10) Patent No.: US 9,660,719 B2
(45) Date of Patent: May 23, 2017

(54) MINIMIZING PROPAGATION TIMES OF QUEUED-UP DATALINK TPDUS

(71) Applicant: Honeywell International Inc., Morristown, NJ (US)

(72) Inventors: Thomas D. Judd, Woodinville, WA (US); Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 241 days.

(21) Appl. No.: 14/543,474

(22) Filed: Nov. 17, 2014

(65) Prior Publication Data

US 2016/0142129 A1    May 19, 2016

(51) Int. Cl.
*H04L 1/18* (2006.01)
*H04L 12/875* (2013.01)
*H04B 7/185* (2006.01)

(52) U.S. Cl.
CPC ....... *H04B 7/18506* (2013.01); *H04L 1/1877* (2013.01); *H04L 1/1883* (2013.01); *H04L 47/56* (2013.01); *H04L 1/1803* (2013.01)

(58) Field of Classification Search
CPC ... H04L 1/1607; H04L 1/1809; H04L 1/1812; H04L 1/1816; H04L 1/1819;
(Continued)

(56) References Cited

U.S. PATENT DOCUMENTS

| 4,031,317 | A | * | 6/1977 | McClain | .............. H04L 7/0331 327/12 |
| 4,726,027 | A | | 2/1988 | Nakamura et al. | |
| 5,297,143 | A | | 3/1994 | Fridrich et al. | |
| 5,453,987 | A | | 9/1995 | Tran | |
| 6,076,181 | A | * | 6/2000 | Cheng | .................. H04L 1/1809 370/216 |
| 6,434,147 | B1 | * | 8/2002 | Brown | .................. H04L 1/1628 370/394 |
| 6,438,105 | B1 | * | 8/2002 | Qarni | ...................... H04L 1/18 358/425 |

(Continued)

FOREIGN PATENT DOCUMENTS

| EP | 1848139 | 10/2007 |
| EP | 2012493 | 1/2009 |

(Continued)

OTHER PUBLICATIONS

U.S. Patent and Trademark Office, "Office Action", U.S. Appl. No. 14/543,466, Jul. 5, 2016, pp. 1-42.
(Continued)

*Primary Examiner* — Michael Thier
*Assistant Examiner* — Eric Nowlin
(74) *Attorney, Agent, or Firm* — Fogg & Powers LLC

(57) ABSTRACT

A method for minimizing propagation time of at least one queued-up datalink TPDU comprises determining whether a current TPDU ready for transmission requires acknowledgement; transmitting the current TPDU, starting a retry timer, and setting a transmission count to one, when acknowledgement required; determining whether acknowledgement received after transmitting the current TPDU; determining whether a pending TPDU is awaiting transmission when acknowledgement is not received; when a pending TPDU is awaiting transmission, determining whether elapsed wait time of the current TPDU is greater than a preselected minimum; incrementing the transmission count by one when elapsed wait time is greater than the preselected minimum; determining again whether there is a pending TPDU awaiting transmission when the transmission count is less than a predetermined maximum and an inactivity timer has not expired; and when there is still at least one pending TPDU awaiting transmission, retransmitting the current TPDU and restarting the retry timer.

20 Claims, 3 Drawing Sheets

(58) Field of Classification Search
CPC ... H04L 1/1835; H04L 1/1848; H04L 1/1851; H04L 1/188; H04L 1/1883; H04L 1/1896; H04L 12/5693; H04L 69/16; H04L 69/28; H04L 1/18; H04L 1/1822; H04L 1/1854; H04L 1/1858; H04L 1/1864; H04L 1/1887; H04L 1/189; H04L 5/0055; H04L 43/0829; H04W 28/04; H04W 84/025; H04B 7/18506; H04B 2001/6908; H04B 2203/5408

See application file for complete search history.

(56) References Cited

U.S. PATENT DOCUMENTS

| | | | |
|---|---|---|---|
| 6,519,223 B1 | 2/2003 | Wager et al. | |
| 6,530,056 B1 | 3/2003 | Boxall et al. | |
| 6,574,770 B1* | 6/2003 | Daudelin | H04L 1/1887 370/392 |
| 6,590,905 B1* | 7/2003 | Suumaki | H04L 29/06 370/466 |
| 6,611,495 B1 | 8/2003 | Meyer et al. | |
| 6,697,331 B1* | 2/2004 | Riihinen | H04L 1/1614 370/236 |
| 6,757,245 B1 | 6/2004 | Kuusinen et al. | |
| 6,778,551 B1* | 8/2004 | Oh | H04L 12/4013 370/445 |
| 6,928,289 B1 | 8/2005 | Cho et al. | |
| 7,031,273 B2 | 4/2006 | Shores et al. | |
| 7,366,096 B2* | 4/2008 | Swami | H04L 12/5602 370/230 |
| 8,094,557 B2 | 1/2012 | Messing et al. | |
| 8,126,012 B2 | 2/2012 | Mishima | |
| 8,179,894 B2 | 5/2012 | Tu | |
| 8,284,043 B2* | 10/2012 | Judd | G08G 5/0013 340/3.1 |
| 8,483,095 B2 | 7/2013 | Hegde et al. | |
| 8,593,954 B2 | 11/2013 | Zhuang | |
| 9,155,111 B2 | 10/2015 | Wang et al. | |
| 2002/0069388 A1* | 6/2002 | Niu | H04L 1/0071 714/748 |
| 2002/0118667 A1* | 8/2002 | Chintada | H04L 1/1621 370/349 |
| 2002/0183900 A1 | 12/2002 | Sainthuile | |
| 2003/0081553 A1* | 5/2003 | Bitar | H04L 12/1868 370/236 |
| 2003/0109973 A1 | 6/2003 | Hensey et al. | |
| 2003/0152030 A1* | 8/2003 | Hershey | H04L 1/188 370/236 |
| 2003/0181214 A1 | 9/2003 | Grob et al. | |
| 2004/0218532 A1* | 11/2004 | Khirman | H04L 29/06 370/235 |
| 2005/0117576 A1 | 6/2005 | McDysan et al. | |
| 2005/0265279 A1* | 12/2005 | Markovic | H04W 76/021 370/328 |
| 2005/0281215 A1* | 12/2005 | Budampati | H04L 1/1887 370/328 |
| 2006/0080451 A1* | 4/2006 | Eckert | G06F 9/544 709/230 |
| 2006/0133554 A1* | 6/2006 | Horn | H04W 56/001 375/354 |
| 2006/0187823 A1* | 8/2006 | Haag | H04L 29/06 370/229 |
| 2006/0285527 A1* | 12/2006 | Gao | H04W 52/0216 370/338 |
| 2006/0285528 A1* | 12/2006 | Gao | H04W 52/0229 370/338 |
| 2006/0291395 A1* | 12/2006 | Ketonen | H04L 1/1685 370/236 |
| 2007/0076639 A1* | 4/2007 | Chou | H04L 41/0213 370/310 |
| 2007/0300120 A1 | 12/2007 | Kim et al. | |
| 2008/0198869 A1* | 8/2008 | Jiang | H04L 1/1685 370/449 |
| 2008/0225703 A1 | 9/2008 | Rider et al. | |
| 2008/0232284 A1* | 9/2008 | Dalsgaard | H04W 72/042 370/310 |
| 2008/0279171 A1* | 11/2008 | Kim | H04L 1/1685 370/346 |
| 2008/0291911 A1 | 11/2008 | Lee et al. | |
| 2009/0077626 A1 | 3/2009 | Leclercq et al. | |
| 2009/0168920 A1* | 7/2009 | Chen | H04L 1/1851 375/295 |
| 2009/0268707 A1 | 10/2009 | Pani et al. | |
| 2010/0008278 A1* | 1/2010 | Kone | H04W 52/0216 370/311 |
| 2010/0014419 A1 | 1/2010 | Lee et al. | |
| 2010/0153804 A1* | 6/2010 | Cai | H04L 47/283 714/748 |
| 2010/0188266 A1* | 7/2010 | Judd | G08G 5/0013 340/945 |
| 2010/0246513 A1 | 9/2010 | Lindskog et al. | |
| 2010/0272104 A1* | 10/2010 | Li | H04L 1/1825 370/390 |
| 2010/0277292 A1 | 11/2010 | McGuffin et al. | |
| 2010/0277347 A1 | 11/2010 | Judd | |
| 2011/0019756 A1* | 1/2011 | Chun | H04L 1/1685 375/260 |
| 2011/0026625 A1* | 2/2011 | Susitaival | H04W 52/0251 375/260 |
| 2011/0090795 A1* | 4/2011 | Li | H04L 43/0829 370/235 |
| 2011/0116427 A1* | 5/2011 | Chang | H04W 52/0216 370/311 |
| 2011/0210870 A1 | 9/2011 | McGuffin | |
| 2012/0099502 A1* | 4/2012 | Park | H04W 28/18 370/311 |
| 2013/0083677 A1* | 4/2013 | Kim | H04W 72/1284 370/252 |
| 2013/0194933 A1* | 8/2013 | Celik | H04L 1/1685 370/242 |
| 2014/0153574 A1 | 6/2014 | Louzoun et al. | |
| 2014/0310405 A1* | 10/2014 | Pope | H04L 69/16 709/224 |
| 2015/0023167 A1* | 1/2015 | Tong | H04L 1/1854 370/230 |
| 2015/0055482 A1 | 2/2015 | Larson et al. | |
| 2015/0163149 A1* | 6/2015 | Norlander | H04L 47/12 370/392 |
| 2015/0212701 A1 | 7/2015 | Rodney et al. | |
| 2016/0142129 A1* | 5/2016 | Judd | H04B 7/18506 370/316 |
| 2016/0142288 A1 | 5/2016 | McGuffin et al. | |

FOREIGN PATENT DOCUMENTS

| | | | |
|---|---|---|---|
| EP | 2211323 | 7/2010 | |
| EP | 2363847 | 7/2011 | |
| GB | WO 2004068801 A1 * | 8/2004 | H04L 45/22 |
| WO | 9851052 | 11/1998 | |
| WO | 2004047357 | 6/2004 | |
| WO | 2006007870 | 1/2006 | |

OTHER PUBLICATIONS

Goossens, "Minimal solution for Congestion Management", "Aeronautical Telecommunications Network Panel Working Group Two", Jul. 6, 1995, p. 6.

Mbarushimana et al., "Resource Efficient TCP: Reducing Contention-Induced Spurious Timeouts in QoS-Aware MANETs", "22nd International Conference on Advanced Information Networking and Applications", Mar. 25-28, 2008, pp. 1070-1077, Publisher: IEEE Computer Society, Published in: GB.

Tamalet, "TP4 timeout and retransmission issues", "Aeronautical Telecommunications Network Panel", May 1999, pp. 1-9, Published in: IT.

European Patent Office, "Extended European Search Report from EP Application No. 15193971.7", from Foreign Counterpart to U.S. Appl. No. 14/543,466, May 3, 2016, pp. 1-6, Published in: EP.

(56) References Cited

OTHER PUBLICATIONS

European Patent Office, "European Extended Search Report from EP Application No. 15193767.9 mailed Apr. 6, 2016", from Foreign Counterpart of U.S. Appl. No. 14/543,474, Apr. 6, 2016, pp. 1-10, Published in: EP.
European Patent Office, "Communication pursuant to Article 94(3) EPC from EP Application No. 15193971.7 mailed Sep. 6, 2016", from Foreign Counterpart of U.S. Appl. No. 14/543,466, Sep. 6, 2016, pp. 1-4, Published in: EP.

* cited by examiner

MINIMIZING PROPAGATION TIMES OF QUEUED-UP DATALINK TPDUS

BACKGROUND

Air Traffic Control (ATC) is now supplementing voice communications with datalink communications between air traffic controllers and pilots. The datalink communication system is specified worldwide by standards from the International Civil Aviation Organization (ICAO). The datalink communication system uses a communication protocol suite called Aeronautical Telecommunication Network (ATN), which is based on the standard seven layer Open Systems Interconnection (OSI) protocols.

One layer of the ATN is the transport (TPS) layer, which contains a retry timer T1 and logic (algorithm) to manage the retry timer. When the retry timer expires, a datalink message in the form of one Transport Protocol Data Unit (TPDU) or sometimes multiple TPDUs is transmitted again by the transport layer, the value of the retry timer is doubled, and the retry timer is started again. This continues until a TPDU acknowledging the transmitted TPDU is received or retries are exhausted. The foregoing algorithm is defined further in ICAO 9880.

A downlink message, such as a Protected Mode (PM) Controller Pilot Data Link Communications (CPDLC) ATN message, can experience excessive delay when a previous downlink message's TPDUs at the transport layer is still waiting to be acknowledged, retransmissions have not been successful, and the airborne transport layer can only send one TPDU at a time, such as when the transport layer is flow controlled or even when not flow controlled. In these situations, the transport retry time doubles each time the downlink TPDU is retransmitted.

For example, if the initial retry time is 20 seconds and a retransmission occurs, then the retry time doubles to 40 seconds, and if another retransmission occurs, then the retry time doubles again to 80 seconds. The delay incurred by this logic can result in the ground application determining that the downlink message is stale (too old) when it is finally received. This can also contribute to increased round trip delays in messages, including one or more TPDUs waiting for a TPDU in front to be transmitted, since the downlink portion may take a lot longer than expected in this condition.

SUMMARY

A method for minimizing propagation time of at least one queued-up datalink transport protocol data unit (TPDU) comprises: determining whether a current datalink TPDU ready for transmission requires an acknowledgement; transmitting the current datalink TPDU, starting a transport retry timer, and setting a transmission count to one, when an acknowledgement is required; determining whether an acknowledgement is received after transmitting the current datalink TPDU; determining whether there is at least one pending datalink TPDU awaiting transmission in a queue when the acknowledgement is not received; when at least one pending datalink TPDU is awaiting transmission, determining whether an elapsed wait time of the current datalink TPDU is greater than a preselected minimum value; incrementing the transmission count by one when the elapsed wait time is greater than the preselected minimum value; determining again whether there is at least one pending datalink TPDU awaiting transmission in the queue when the transmission count is less than a predetermined maximum value and a transport inactivity timer has not expired; and when there is still at least one pending datalink TPDU awaiting transmission, retransmitting the current datalink TPDU and restarting the retry timer.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
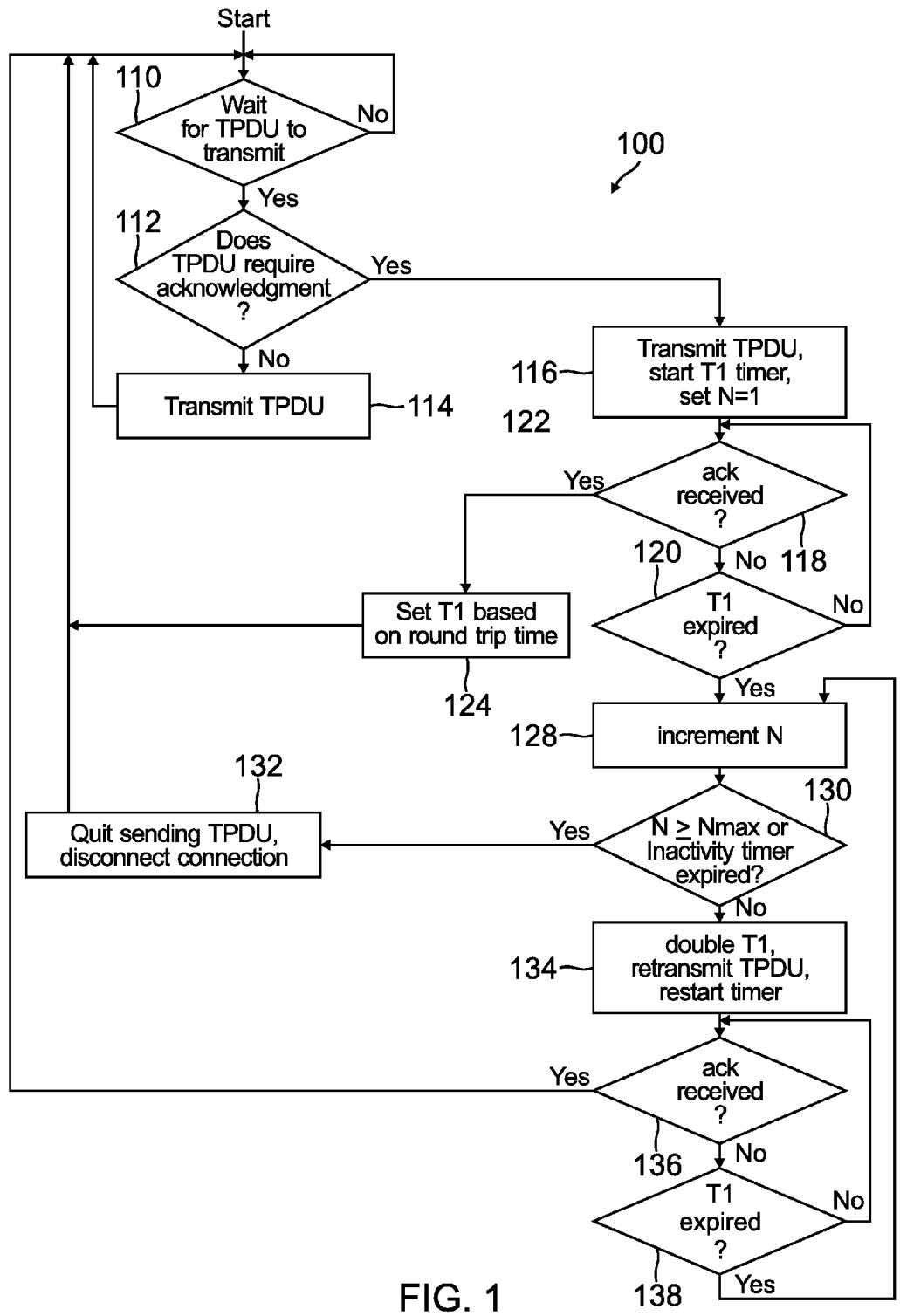
FIG. 1 is a flow diagram representing a conventional method for operation of a transport retry timer in aeronautical telecommunications.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method for minimizing propagation times of at least one queued-up datalink Transport Protocol Data Unit (TPDU) is provided. The method retransmits the datalink TPDU or multiple TPDUs, unless an acknowledgement arrives sooner. The present method can be applied to an aeronautical transport layer, such as an Aeronautical Telecommunication Network (ATN) transport layer, or a Transmission Control Protocol/Internet Protocol (TCP/IP) transport layer. In one implementation, the present method can be applied to an ATN transport layer that is flow controlled. The present approach significantly reduces message propagation delay, and is applicable to both downlink and uplink messages.

As used herein, a "current" datalink TPDU refers to a first datalink TPDU at the transport layer that is waiting to be acknowledged while being retransmitted. A "pending" datalink TPDU refers to a second datalink TPDU waiting to be sent because of the current datalink TPDU.

In one implementation, if a second datalink TPDU enters a "send" transport TPDU queue, with a first datalink TPDU already waiting for acknowledgment, then the first datalink TPDU is retransmitted after a predetermined threshold of time has passed, unless the acknowledgement of the first datalink TPDU arrives beforehand. For example, if the threshold time is set to x seconds (e.g., 20 seconds), and there is at least one pending (second) datalink TPDU at the transport layer waiting for transmission, then the current (first) datalink TPDU is retransmitted every x seconds, rather than using the standard retry logic and dynamic retry timer algorithm, which doubles the retry time every retransmission. If there is no pending datalink TPDU, then the standard retry logic and dynamic retry timer algorithm are used. If the elapsed wait time for a current datalink TPDU awaiting acknowledgment is greater than the threshold value, and another datalink TPDU provided to the transport layer is ready to be sent, then the current datalink TPDU can be immediately retransmitted.

Various alternatives of the present method can be implemented when there is at least one pending datalink TPDU. In one embodiment, when the minimum value of the retry timer is zero, the current datalink TPDU is retransmitted immediately. In another embodiment, the current datalink TPDU is retransmitted when the minimum value of the retry timer has expired. In a further embodiment, the retry timer is set to the minimum value and the current datalink TPDU is retransmitted. In an alternative embodiment, the retry timer is set to the minimum value and the current datalink TPDU is retransmitted after the retry timer expires.

It should be noted that even if there is no flow control, the present method can still be used as the transport layer has to deliver messages in order. For example, if a first downlink TPDU is not received/acknowledged on the ground, then the other TPDUs behind the first downlink TPDU will not be delivered until the first downlink TPDU is received and acknowledged.

The present approach allows pending messages to be downlinked/uplinked much quicker once congestion is cleared. This can significantly reduce round trip message delay times, and prevent messages from becoming stale that are waiting for another message ahead of them to be acknowledged.

The present method can be implemented as a revision to the ATN transport layer software in the ATN system. The ATN transport layer software is typically contained in the Communications Management Unit (CMU) or Communications Management Function (CMF) of an aircraft for downlink communications with Air Traffic Control (ATC). The ATN transport layer software can also be contained in the Flight Management Computer (FMC) or Flight Management Function (FMF) of an aircraft.

In one embodiment, the present method can be implemented as part of the communication protocols of an ATN controller pilot data link communication (CPDLC) system onboard an aircraft. In another embodiment, the present method can be implemented as part of the communication protocols of a TCP/IP system onboard an aircraft.

The present method can also be implemented in the ground functions of an ATC center that operate in an uplink direction. Alternatively, the present method can be implemented in Future Automatic Dependent Surveillance (ADS).

FIG. 1 is a flow diagram representing a conventional method 100 for operation of a transport retry timer in aircraft telecommunications such as the ATN. The method 100 starts by waiting for a datalink message such as a TPDU or multiple TPDUs to transmit (block 110). When one or more TPDUs are ready, a determination is made whether the TPDU requires an acknowledgement (block 112). If not, the TPDU is transmitted (block 114), and method 100 returns to block 110 to await another TPDU to transmit. If an acknowledgement is required, the TPDU is transmitted, the retry timer (T1) is started, and a transmission count (N) is set to one (block 116).

A determination is then made whether an acknowledgement (ack) is received (block 118). If not, a determination is made whether the retry timer has expired (block 120). If not, method 100 repeats the steps of blocks 118 and 120 until the acknowledgement is received or the retry timer has expired. If the acknowledgement is received, the retry timer is set based on the actual round trip time (block 124), and method 100 returns to block 110 to await another datalink TPDU to transmit.

Returning to block 120, if the retry timer has expired, the transmission count is incremented by one (block 128), and a determination is made whether the transmission count is greater than or equal to a predetermined maximum value ($N_{max}$) (e.g., 8) or whether an inactivity timer has expired (block 130). If yes in either instance, method 100 quits sending the TPDU and disconnects the connection (block 132), and then returns to block 110 to await another datalink message to transmit. If the transmission count is less than the predetermined maximum value and the inactivity timer has not expired, the retry timer value is doubled, the TPDU is retransmitted, and the retry timer is restarted (block 134).

A determination is then made again whether the acknowledgement is received (block 136). If yes, method 100 returns to block 110; if no, a determination is made whether the retry timer has expired (block 138). If not, method 100 repeats the steps of blocks 136 and 138 until the acknowledgement is received or the retry timer has expired. If the retry timer expires without the acknowledgement being received, method 100 returns to block 128 to increment the transmission count, and repeats the steps following block 128 until the maximum allowed transmission count is reached, the inactivity timer has expired, or an acknowledgement is received.

A datalink message can experience excessive delay when one or more previous datalink TPDUs at the transport layer are still waiting to be acknowledged, retransmissions have not been successful, and especially, when the transport layer is flow controlled to send one TPDU at a time. In this situation, the retry timer doubles each time the datalink TPDU is retransmitted. This result occurs, for example, when method 100 of FIG. 1 is employed in aircraft telecommunications.

Figure 2:
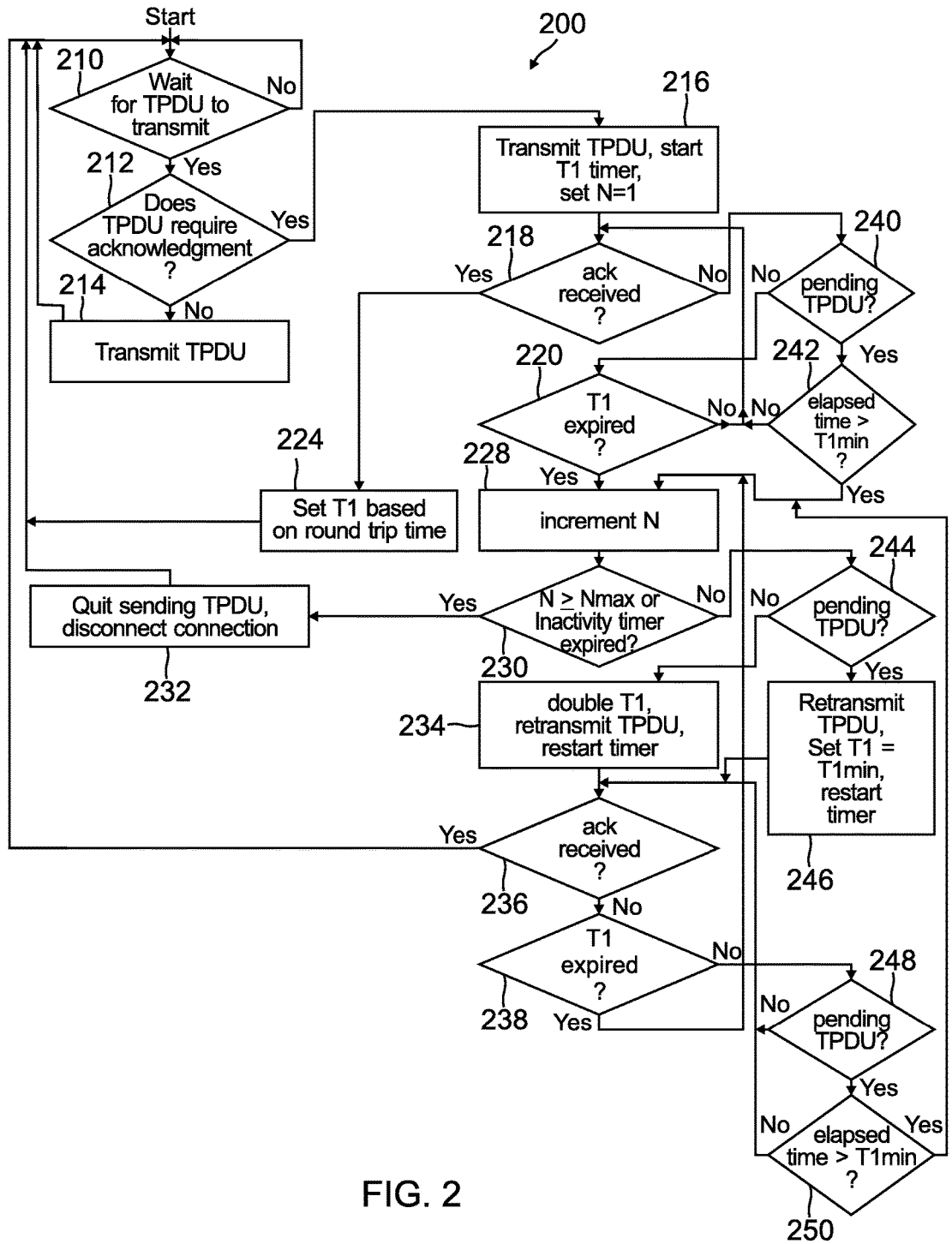
FIG. 2 is a flow diagram representing an enhanced method for operation of a transport retry timer in aeronautical telecommunications according to one approach.

FIG. 2 is a flow diagram representing a method 200 for enhanced operation of a transport retry timer in aeronautical telecommunications such as the ATN according to one approach. The method 200 provides enhancements to the method of FIG. 1 that minimize propagation times of queued-up datalink TPDUs.

The method 200 starts by waiting for a current TPDU to transmit (block 210). When a current TPDU is ready, a determination is made whether the current TPDU requires an acknowledgement (block 212). If not, the current TPDU is transmitted (block 214), and method 200 returns to block 210 to await another TPDU to transmit. If an acknowledgement is required, the current TPDU is transmitted, the retry timer (T1) is started, and a transmission count (N) is set to one (block 216). A determination is then made whether an acknowledgement is received (block 218). If yes, the retry timer is set based on the actual round trip time (block 224), and method 200 returns to block 210 to await another TPDU to transmit.

Returning to block 218, if an acknowledgement has not been received, a determination is made whether one or more pending TPDUs are awaiting transmission in a queue (block 240). Any pending TPDUs would be queued behind the current TPDU awaiting acknowledgement. If a pending TPDU is awaiting transmission, a determination is made whether an elapsed wait time of the current TPDU is greater than a preselected minimum value ($T1_{min}$) (block 242). If not, method 200 returns to block 218 to again determine whether an acknowledgement is received and repeats the steps as described above.

Returning to block 240, if there are no pending TPDUs, then a determination is made whether the retry timer has expired (block 220). If not, method 200 repeats the steps of blocks 218, 240, and 220 until the acknowledgement is received, a pending TPDU exists, or the retry timer expires. If the retry timer has expired at block 220, then the transmission count is incremented by one (block 228). Returning to block 242, if the elapsed wait time is greater than the preselected minimum value, then the transmission count is incremented by one at block 228.

A determination is then made whether the transmission count is greater than or equal to a predetermined maximum value ($N_{max}$), or whether a transport inactivity timer has expired (block 230). If yes in either instance, method 200 quits sending the current TPDU and disconnects the connection (block 232), and returns to block 210 to await another datalink TPDU to transmit.

If the transmission count is less than the predetermined maximum value and the inactivity timer has not expired, a determination is again made whether a pending TPDU is awaiting transmission in the queue (block 244). If yes, the current TPDU is retransmitted, the retry timer can be set to the preselected minimum value, and the retry timer is restarted (block 246).

If there are no pending TPDUs, the retry timer value is doubled, the current TPDU is retransmitted, and the retry timer is restarted (block 234). In either case, a determination is then made again whether an acknowledgement is received (block 236). If yes, method 200 returns to block 210 to await another TPDU to transmit; if no, a determination is made whether the retry timer has expired (block 238). If the retry timer expires without the acknowledgement being received, method 200 returns to block 228 to increment the transmission count, and repeats the steps following block 228 until the maximum allowed transmission count is reached, the inactivity timer expires, or an acknowledgement is received.

If the retry timer has not expired at block 238, then a further determination is made whether a pending TPDU is awaiting transmission in the queue (block 248). If yes, then a determination is made whether the elapsed wait time of the current TPDU is greater than the preselected minimum value (block 250). If yes, method 200 returns to block 228 to increment the transmission count, and determines whether the maximum transmission count is reached or the inactivity timer has expired at block 230. If not in both instances, method 200 checks again whether there is a pending TPDU awaiting transmission (block 244). If a pending TPDU is awaiting transmission, method 200 sets the retry timer to the preselected minimum value, retransmits the current TPDU, and restarts the retry timer. A determination is then made again whether the acknowledgement is received at block 236. If not, method 200 repeats the steps following block 236 until the maximum allowed transmission count is reached, the inactivity timer has expired, or an acknowledgement is received.

If there are no pending TPDUs at block 248, method 200 returns to block 236 to again determine whether an acknowledgement is received and repeats the steps following block 236. Likewise, if the elapsed wait time is not greater than the preselected minimum value at block 250, method 200 returns to block 236 to again determine whether an acknowledgement is received and repeats the steps following block 236.

Figure 3:
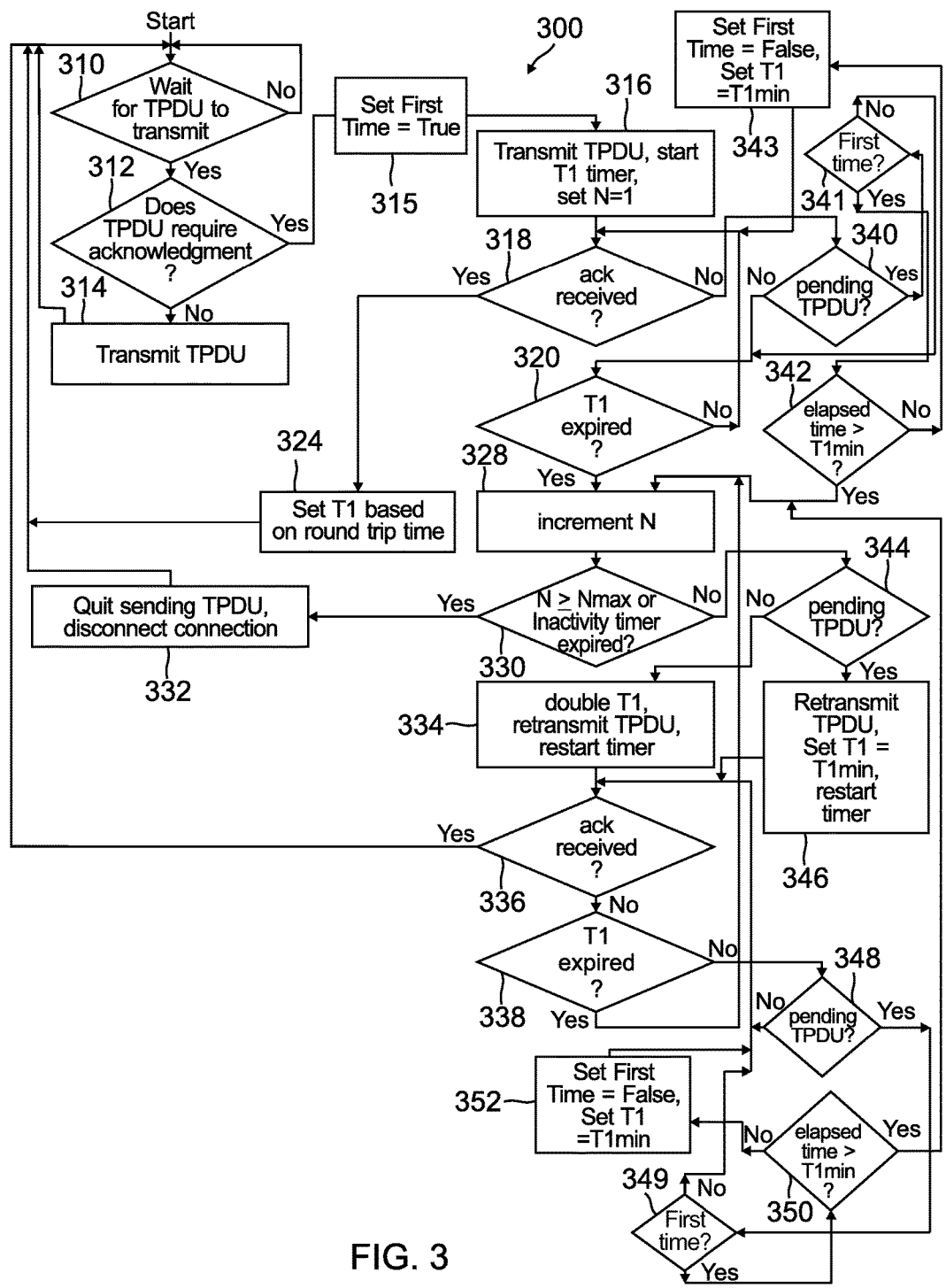
FIG. 3 is a flow diagram representing an enhanced method for operation of a transport retry timer in aeronautical telecommunications according to another approach.

FIG. 3 is a flow diagram representing a method 300 for enhanced operation of a transport retry timer in aeronautical telecommunications such as the ATN according to another approach. The method 300 starts by waiting for a current TPDU to transmit (block 310). When a current TPDU is ready, a determination is made whether the current TPDU requires an acknowledgement (block 312). If not, the current TPDU is transmitted (block 314), and method 300 returns to block 310 to await another TPDU to transmit. If an acknowledgement is required, a first time parameter is set to true (block 315). The current TPDU is then transmitted, the retry timer (T1) is started, and a transmission count (N) is set to one (block 316). A determination is then made whether an acknowledgement is received (block 318). If yes, the retry timer is set based on the actual round trip time (block 324), and method 300 returns to block 310 to await another TPDU to transmit.

Returning to block 318, if an acknowledgement has not been received, a determination is made for whether one or more pending TPDUs are awaiting transmission in a queue (block 340). If yes, a determination is made whether this is the first time a pending TPDU is awaiting transmission (block 341). If yes, a determination is made whether an elapsed wait time of the current TPDU is greater than a preselected minimum value ($T1_{min}$) (block 342). If not, the first time parameter is set to false and the retry timer is set to the preselected minimum value (block 343). The method 300 then returns to block 318 to again determine whether an acknowledgement is received.

Returning to blocks 340 and 341, if there are no pending TPDUs, or this not the first time a pending TPDU is awaiting transmission (first time=false), then a determination is made whether the retry timer has expired (block 320). If not, method 300 returns to block 318 to again determine whether an acknowledgement is received. If the retry timer has expired at block 320, then the transmission count is incremented by one (block 328). Returning to block 342, if the elapsed wait time of the current TPDU is greater than the preselected minimum value, then the transmission count is incremented by one at block 328.

A determination is then made whether the transmission count is greater than or equal to a predetermined maximum value ($N_{max}$), or whether a transport inactivity timer has expired (block 330). If yes in either instance, method 300 quits sending the current TPDU and disconnects the connection (block 332), and returns to block 310 to await another datalink TPDU to transmit.

If the transmission count is less than the predetermined maximum value and the inactiviy timer has not expired, a determination is made whether a pending TPDU is awaiting transmission in the queue (block 344). If yes, the current TPDU is retransmitted, the retry timer is set to the preselected minimum value, and the retry timer is restarted (block 346); if there are no pending TPDUs, the retry timer value is doubled, the current TPDU is retransmitted, and the retry timer is restarted (block 334). In either case, a determination is then made again whether an acknowledgement is received (block 336). If yes, method 300 returns to block 310 to await another TPDU to transmit; if no, a determination is made whether the retry timer has expired (block 338). If the retry timer expires without the acknowledgement being received, method 300 returns to block 328 to increment the transmission count, and repeats the steps following block 328 until the maximum allowed transmission count is reached, the inactivity timer expires, or an acknowledgement is received.

If the retry timer has not expired at block 338, then a further determination is made whether one or more pending TPDUs are awaiting transmission in the queue (block 348). If yes, a determination is made whether this is the first time a pending TPDU is awaiting transmission (block 349). If yes, a determination is made whether an elapsed wait time of the current TPDU is greater than the preselected minimum value (block 350). If not, the first time parameter is set to false and the retry timer is set to the preselected minimum value (block 352). The method 300 then returns to block 336 to again determine whether an acknowledgement is received. Returning to blocks 348 and 349, if there are no pending TPDUs, or this not the first time a pending TPDU is awaiting transmission (first time=false), then method 300 returns to block 336 to again determine whether an acknowledgement is received.

If the elapsed wait time of the current TPDU is greater than the preselected minimum value at block 350, method 300 returns to block 328 to increment the transmission count, and determines whether the maximum transmission count is reached or the inactivity timer has expired at block 330. If not in both instances, method 300 checks again whether there is a pending TPDU awaiting transmission at block 344. If a pending TPDU is awaiting transmission, method 300 sets the retry timer to the preselected minimum value, retransmits the current TPDU, and restarts the retry timer. A determination is then made again whether the acknowledgement is received at block 336. If not, method 300 repeats the steps following block 336 until the maximum allowed transmission count is reached, the inactivity timer has expired, or an acknowledgement is received.

A computer or processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method for minimizing propagation times of at least one queued-up datalink TPDU, the method comprising: (a) determining whether a current datalink TPDU ready for transmission requires an acknowledgement; (b) transmitting the current datalink TPDU, starting a transport retry timer, and setting a transmission count to one, when an acknowledgement is required; (c) determining whether an acknowledgement is received after transmitting the current datalink TPDU; (d) determining whether there is at least one pending datalink TPDU awaiting transmission in a queue when the acknowledgement is not received; (e) when at least one pending datalink TPDU is awaiting transmission, determining whether an elapsed wait time of the current datalink TPDU is greater than a preselected minimum value; (f) incrementing the transmission count by one when the elapsed wait time is greater than the preselected minimum value; (g) determining again whether there is at least one pending datalink TPDU awaiting transmission in the queue when the transmission count is less than a predetermined maximum value and a transport inactivity timer has not expired; and (h) when there is still at least one pending datalink TPDU awaiting transmission, retransmitting the current datalink TPDU and restarting the retry timer.

Example 2 includes the method of Example 1, further comprising: setting the retry timer to the preselected minimum value when the current datalink TPDU is retransmitted.

Example 3 includes the method of Example 1, further comprising: (i) determining whether an acknowledgement is received after retransmitting the current datalink TPDU; and (j) determining whether the retry timer has expired if the acknowledgement has not been received after retransmitting the current datalink TPDU.

Example 4 includes the method of Example 3, wherein when the retry timer has not expired, the method further comprising: determining again whether there is at least one pending datalink TPDU awaiting transmission in the queue; and when there is still at least one pending datalink TPDU awaiting transmission, determining whether the elapsed wait time of the current datalink TPDU is greater than the preselected minimum value.

Example 5 includes the method of Example 4, wherein when the elapsed wait time of the current datalink TPDU is greater than the preselected minimum value, the method further comprising returning to step (f) to increment the transmission count by one.

Example 6 includes the method of Example 4, wherein when the elapsed wait time of the current datalink TPDU is not greater than the preselected minimum value, the method further comprising: returning to step (i) to determine whether an acknowledgement is received.

Example 7 includes the method of Example 3, wherein when the retry timer has expired, the method further comprising: returning to step (f) to increment the transmission count by one.

Example 8 includes the method of Example 1, wherein when there is no pending datalink TPDU, the method further comprising: determining whether the retry timer has expired; and incrementing the transmission count by one when the retry timer has expired.

Example 9 includes the method of Example 1, wherein when the elapsed wait time is not greater than the preselected minimum value, the method further comprising: returning to step (c) to determine whether an acknowledgement is received.

Example 10 includes the method of Example 3, wherein when there is not at least one pending datalink TPDU awaiting transmission at step (g), the method further comprising: doubling the retry timer value, retransmitting the current datalink TPDU, and restarting the retry timer; and returning to step (i) to determine whether an acknowledgement is received.

Example 11 includes the method of any of Examples 1-10, wherein the method is implemented as part of communication protocols in an ATN system.

Example 12 includes the method of any of Examples 1-10, wherein the method is implemented as part of communication protocols in a TCP/IP system.

Example 13 includes the method of any of Examples 1-11, wherein the current datalink TPDU is from an ATN transport layer that is flow controlled.

Example 14 includes the method of any of Examples 1-10 and 12, wherein the current datalink TPDU is from a TCP/IP transport layer.

Example 15 includes the method of any of Examples 1-10, wherein the current datalink TPDU is an aircraft downlink TPDU.

Example 16 includes the method of any of Examples 1-10, wherein the current datalink TPDU is an ATC uplink TPDU.

Example 17 includes a computer system comprising: a processor; and a computer readable medium having instructions stored thereon, executable by the processor, to perform a method for minimizing propagation time of at least one queued-up datalink TPDU, according to any of Examples 1-16.

Example 18 includes a method for minimizing propagation time of at least one queued-up datalink TPDU, the method comprising: (a) determining whether a current datalink TPDU ready for transmission requires an acknowledgement; (b) transmitting the current datalink TPDU, starting a transport retry timer, and setting a transmission count to one, when an acknowledgement is required; (c) determining whether an acknowledgement is received after transmitting the current datalink TPDU; (d) determining whether there is at least one pending datalink TPDU awaiting transmission in a queue when the acknowledgement is not received; (e) when at least one pending datalink TPDU is awaiting transmission, determining whether this is the first time a pending TPDU is awaiting transmission; if this is the first time a pending TPDU is awaiting transmission, determining whether an elapsed wait time of the current datalink TPDU is greater than a preselected minimum value; if the elapsed wait time of the current datalink TPDU is not greater than a preselected minimum value, setting a retry timer to the preselected minimum value and returning to step (c) to determine whether an acknowledgement is received; (f) when this is not the first time a pending TPDU is awaiting transmission, determining whether the retry timer has expired; (g) incrementing the transmission count by one when the retry timer has expired; (h) determining again whether there is at least one pending datalink TPDU awaiting transmission in the queue when the transmission count is less than a predetermined maximum value and a transport inactivity timer has not expired; and (i) when there is still at least one pending datalink TPDU awaiting transmission, retransmitting the current datalink TPDU, setting the retry timer to the preselected minimum value, and restarting the retry timer.

Example 19 includes the method of Example 18, further comprising: (j) determining whether an acknowledgement is received after retransmitting the current datalink TPDU; (k) determining whether the retry timer has expired if the acknowledgement has not been received after retransmitting the current datalink TPDU; (l) if the retry timer has not expired, determining again whether there is at least one pending datalink TPDU awaiting transmission in the queue; (m) when at least one pending datalink TPDU is awaiting transmission, determining whether this is the first time a pending TPDU is awaiting transmission; (n) when this is the first time a pending TPDU is awaiting transmission, determining whether an elapsed wait time of the current datalink TPDU is greater than a preselected minimum value; if the elapsed wait time of the current datalink TPDU is not greater than a preselected minimum value, setting the retry timer to the preselected minimum value and returning to step (j) to determine whether an acknowledgement is received; or if the elapsed wait time of the current datalink TPDU is greater than the preselected minimum value, returning to step (g) to increment the transmission count by one.

Example 20 includes the method of Example 19, wherein if this is not the first time a pending TPDU is awaiting transmission after step (m), returning to step (j) to determine whether an acknowledgement is received.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for minimizing propagation time of at least one queued-up datalink transport protocol data unit (TPDU), the method comprising:
   (a) determining whether a current datalink TPDU ready for transmission requires an acknowledgement;
   (b) transmitting the current datalink TPDU, starting a transport retry timer, and setting a transmission count to one, when an acknowledgement is required;
   (c) determining whether the acknowledgement is received after transmitting the current datalink TPDU;
   (d) determining whether there is at least one pending datalink TPDU awaiting transmission in a queue when the acknowledgement is not received;
   (e) when at least one pending datalink TPDU is awaiting transmission, determining whether an elapsed wait time of the current datalink TPDU is greater than a preselected minimum value;
   (f) incrementing the transmission count by one when the elapsed wait time is greater than the preselected minimum value;
   (g) determining again whether there is at least one pending datalink TPDU awaiting transmission in the queue when the transmission count is less than a predetermined maximum value and a transport inactivity timer has not expired; and
   (h) when there is still at least one pending datalink TPDU awaiting transmission, retransmitting the current datalink TPDU and restarting the transport retry timer.

2. The method of claim 1, further comprising:
setting the transport retry timer to the preselected minimum value when the current datalink TPDU is retransmitted.

3. The method of claim 1, further comprising:
   (i) determining whether the acknowledgement is received after retransmitting the current datalink TPDU; and
   (j) determining whether the transport retry timer has expired if the acknowledgement has not been received after retransmitting the current datalink TPDU.

4. The method of claim 3, wherein if the transport retry timer has not expired, the method further comprising:

determining again whether there is at least one pending datalink TPDU awaiting transmission in the queue; and
when there is still at least one pending datalink TPDU awaiting transmission, determining whether the elapsed wait time of the current datalink TPDU is greater than the preselected minimum value.

5. The method of claim 4, wherein when the elapsed wait time of the current datalink TPDU is greater than the preselected minimum value, the method further comprising:
returning to step (f) to increment the transmission count by one.

6. The method of claim 4, wherein when the elapsed wait time of the current datalink TPDU is not greater than the preselected minimum value, the method further comprising:
returning to step (i) to determine whether the acknowledgement is received.

7. The method of claim 3, wherein when the transport retry timer has expired, the method further comprising:
returning to step (f) to increment the transmission count by one.

8. The method of claim 1, wherein when there is no pending datalink TPDU at step (d), the method further comprising:
determining whether the transport retry timer has expired; and
incrementing the transmission count by one when the transport retry timer has expired.

9. The method of claim 1, wherein when the elapsed wait time is not greater than the preselected minimum value, the method further comprising:
returning to step (c) to determine whether the acknowledgement is received.

10. The method of claim 3, wherein when there is not at least one pending datalink TPDU awaiting transmission at step (g), the method further comprising:
doubling a value of the transport retry timer, retransmitting the current datalink TPDU, and restarting the transport retry timer; and
returning to step (i) to determine whether the acknowledgement is received.

11. The method of claim 1, wherein the method is implemented as part of communication protocols in an aeronautical telecommunication network (ATN) system.

12. The method of claim 1, wherein the method is implemented as part of communication protocols in a transmission control protocol/internet protocol (TCP/IP) system.

13. The method of claim 1, wherein the current datalink TPDU is from an aeronautical telecommunication network (ATN) layer that is flow controlled.

14. The method of claim 1, wherein the current datalink TPDU is from a transmission control protocol/internet protocol (TCP/IP) layer.

15. The method of claim 1, wherein the current datalink TPDU is an aircraft downlink TPDU.

16. The method of claim 1, wherein the current datalink TPDU is an air traffic control (ATC) uplink TPDU.

17. A computer system comprising:
a processor; and
a computer readable medium having instructions stored thereon, executable by the processor, to perform a method for minimizing propagation time of at least one queued-up datalink TPDU, according to claim 1.

18. A method for minimizing propagation time of at least one queued-up datalink transport protocol data unit (TPDU), the method comprising:
(a) determining whether a current datalink TPDU ready for transmission requires an acknowledgement;
(b) transmitting the current datalink TPDU, starting a transport retry timer, and setting a transmission count to one, when an acknowledgement is required;
(c) determining whether the acknowledgement is received after transmitting the current datalink TPDU;
(d) determining whether there is at least one pending datalink TPDU awaiting transmission in a queue when the acknowledgement is not received;
(e) when at least one pending datalink TPDU is awaiting transmission, determining whether this is the first time a pending TPDU is awaiting transmission;
  (i) if this is the first time a pending TPDU is awaiting transmission, determining whether an elapsed wait time of the current datalink TPDU is greater than a preselected minimum value;
  (ii) if the elapsed wait time of the current datalink TPDU is not greater than a preselected minimum value, setting the transport retry timer to the preselected minimum value and returning to step (c) to determine whether the acknowledgement is received;
(f) when this is not the first time a pending TPDU is awaiting transmission, determining whether the transport retry timer has expired;
(g) incrementing the transmission count by one when the transport retry timer has expired;
(h) determining again whether there is at least one pending datalink TPDU awaiting transmission in the queue when the transmission count is less than a predetermined maximum value and a transport inactivity timer has not expired; and
(i) when there is still at least one pending datalink TPDU awaiting transmission, retransmitting the current datalink TPDU, setting the transport retry timer to the preselected minimum value, and restarting the transport retry timer.

19. The method of claim 1, further comprising:
(j) determining whether the acknowledgement is received after restransmitting the current datalink TPDU;
(k) determining whether the transport retry timer has expired if the acknowledgement has not been received after retransmitting the current datalink TPDU;
(l) if the transport retry timer has not expired, determining again whether there is at least one pending datalink TPDU awaiting transmission in the queue;
(m) when at least one pending datalink TPDU is awaiting transmission, determining whether this is the first time a pending TPDU is awaiting transmission;
(n) when this is the first time a pending TPDU is awaiting transmission, determining whether an elapsed wait time of the current datalink TPDU is greater than a preselected minimum value;
  (i) if the elapsed wait time of the current datalink TPDU is not greater than a preselected minimum value, setting the transport retry timer to the preselected minimum value and returning to step (j) to determine whether the acknowledgement is received; or
  (ii) if the elapsed wait time of the current datalink TPDU is greater than the preselected minimum value, returning to step (g) to increment the transmission count by one.

20. The method of claim 19, wherein if this is not the first time a pending TPDU is awaiting transmission after step (m), returning to step (j) to determine whether the acknowledgement is received.

* * * * *